(12) United States Patent
Takahashi et al.

(10) Patent No.: US 9,334,926 B2
(45) Date of Patent: May 10, 2016

(54) DRIVE FORCE TRANSMISSION APPARATUS

(75) Inventors: Yuuya Takahashi, Tokai (JP);
Yasuyoshi Suzuki, Chiryu (JP); Hiroki Ozaki, Kosai (JP); Masaru Irie, Kosai (JP); Yoshiyasu Inoue, Kosai (JP); Takashi Kawasaki, Susono (JP)

(73) Assignee: DENSO CORPORATION, Kariya (JP)

( * ) Notice: Subject to any disclaimer, the term of this patent is extended or adjusted under 35 U.S.C. 154(b) by 313 days.

(21) Appl. No.: 14/005,366

(22) PCT Filed: Jan. 16, 2012

(86) PCT No.: PCT/JP2012/051283
§ 371 (c)(1),
(2), (4) Date: Sep. 16, 2013

(87) PCT Pub. No.: WO2012/127897
PCT Pub. Date: Sep. 27, 2012

(65) Prior Publication Data
US 2014/0007723 A1    Jan. 9, 2014

(30) Foreign Application Priority Data
Mar. 22, 2011  (JP) .................. 2011-063012

(51) Int. Cl.
*F16H 57/00*  (2012.01)
*F16H 1/20*  (2006.01)
(Continued)

(52) U.S. Cl.
CPC *F16H 1/20* (2013.01); *F02D 15/02* (2013.01); *F16H 3/003* (2013.01); *Y10T 74/19614* (2015.01)

(58) Field of Classification Search
CPC ............ F16H 1/20; F16H 3/003; F02D 15/02
USPC .................. 74/405, 665 A, 333, 30
See application file for complete search history.

(56) References Cited

U.S. PATENT DOCUMENTS 1,140,132 A     5/1915  Dorsey
2,107,422 A  *  2/1938  Moross ............... F16H 61/0293
                                              192/48.3

(Continued)

FOREIGN PATENT DOCUMENTS

DE      297 11 278      5/1998
EP      0 508 718       10/1992
(Continued)

OTHER PUBLICATIONS

International Search Report for PCT/JP2012/051283, mailed May 9, 2012.

(Continued)

*Primary Examiner* — William Kelleher
*Assistant Examiner* — Zakaria Elahmadi
(74) *Attorney, Agent, or Firm* — Nixon & Vanderhye P.C.

(57) ABSTRACT

In a drive force transmission apparatus, when an input shaft is rotated in a normal rotational direction, a rotational force of the input shaft is transmitted to an output shaft through a one-way clutch to rotate the output shaft at a rotational speed, which is the same as a rotational speed of the input shaft. At this time, an input side sub-shaft is freed from an output side sub-shaft. In contrast, when the input shaft is rotated in a reverse rotational direction, the rotational force of the input shaft is transmitted to the output shaft through an input gear, a first gear, the input side sub-shaft, a two-way clutch, the output side sub-shaft, a second gear and an output gear. At this time, the output shaft is freed from an intermediate shaft.

5 Claims, 10 Drawing Sheets

(51) Int. Cl.
*F02D 15/02* (2006.01)
*F16H 3/00* (2006.01)

(56) References Cited

U.S. PATENT DOCUMENTS

| | | | | |
|---|---|---|---|---|
| 2,164,086 | A * | 6/1939 | Rust | F16H 29/08 74/124 |
| 2,315,808 | A * | 4/1943 | Miller | F16H 3/006 192/3.51 |
| 2,473,250 | A | 6/1949 | Hoffman | |
| 2,999,398 | A * | 9/1961 | Christian | F16H 1/20 464/158 |
| 3,000,229 | A * | 9/1961 | Christian | F16H 1/20 74/411 |
| 3,362,245 | A * | 1/1968 | Welch, Jr. | F16H 3/006 192/114 R |
| 3,372,601 | A * | 3/1968 | Dry | F16H 9/24 74/336 R |
| 3,498,151 | A * | 3/1970 | King | F16D 25/10 192/109 F |
| 3,714,834 | A * | 2/1973 | Digby | F02N 15/023 74/405 |
| 5,176,038 | A * | 1/1993 | Inokuchi | B25B 13/467 192/48.92 |
| 5,557,987 | A * | 9/1996 | Lotsch | F16H 3/003 192/36 |
| 5,653,142 | A * | 8/1997 | Kato | F16D 41/206 185/40 R |
| 8,951,025 | B2 * | 2/2015 | Schultz | F16H 61/0028 123/179.31 |
| 2002/0037786 | A1 * | 3/2002 | Hirano | F16H 61/6648 475/208 |
| 2002/0166744 | A1 * | 11/2002 | Nojiri | F16D 47/04 192/13 R |
| 2003/0051959 | A1 * | 3/2003 | Blair | B60K 23/06 192/21 |
| 2003/0226415 | A1 * | 12/2003 | Baker | F16D 41/067 74/333 |
| 2004/0152556 | A1 | 8/2004 | Tomita et al. | |
| 2007/0144854 | A1 * | 6/2007 | Murata | F16D 41/067 192/38 |
| 2011/0260426 | A1 * | 10/2011 | Yang | B62M 11/02 280/259 |
| 2011/0269587 | A1 * | 11/2011 | Papania | F16D 41/125 474/148 |
| 2011/0271795 | A1 * | 11/2011 | Takada | F16D 41/066 74/810.1 |
| 2012/0006153 | A1 * | 1/2012 | Imamura | B60K 6/442 74/665 A |
| 2013/0305856 | A1 * | 11/2013 | Klimes | F16H 1/20 74/89.16 |
| 2014/0000400 | A1 * | 1/2014 | Klimes | F16H 1/20 74/421 A |

FOREIGN PATENT DOCUMENTS

| | | |
|---|---|---|
| FR | 1 006 678 | 4/1952 |
| JP | H6-8945 | 2/1994 |
| JP | 2004-183594 | 7/2004 |
| JP | 2006-234062 | 9/2006 |
| JP | 2009-79408 | 4/2009 |
| WO | WO 88/09450 | 12/1988 |

OTHER PUBLICATIONS

Written Opinion for PCT/JP2012/051283, mailed May 9, 2012.
Office Action (5 pages) dated Jun. 26, 2015, issued in corresponding Chinese Application No. 201280014028.X and English translation (3 pages).

* cited by examiner

STANDBY STATE

DRIVE FORCE TRANSMITTING STATE
(Rin>Rout)

DRIVE FORCE TRANSMITTING STATE
(Rin>Rout)
DRIVING OUTER RACE (Rin<0)

FREED STATE (Rin<Rout)

FREED STATE (Rin<Rout)
DRIVING OUTER RACE (Rout>0)

DRIVE FORCE TRANSMITTING STATE (Sin>Sout)

FREED STATE (Sin<Sout)

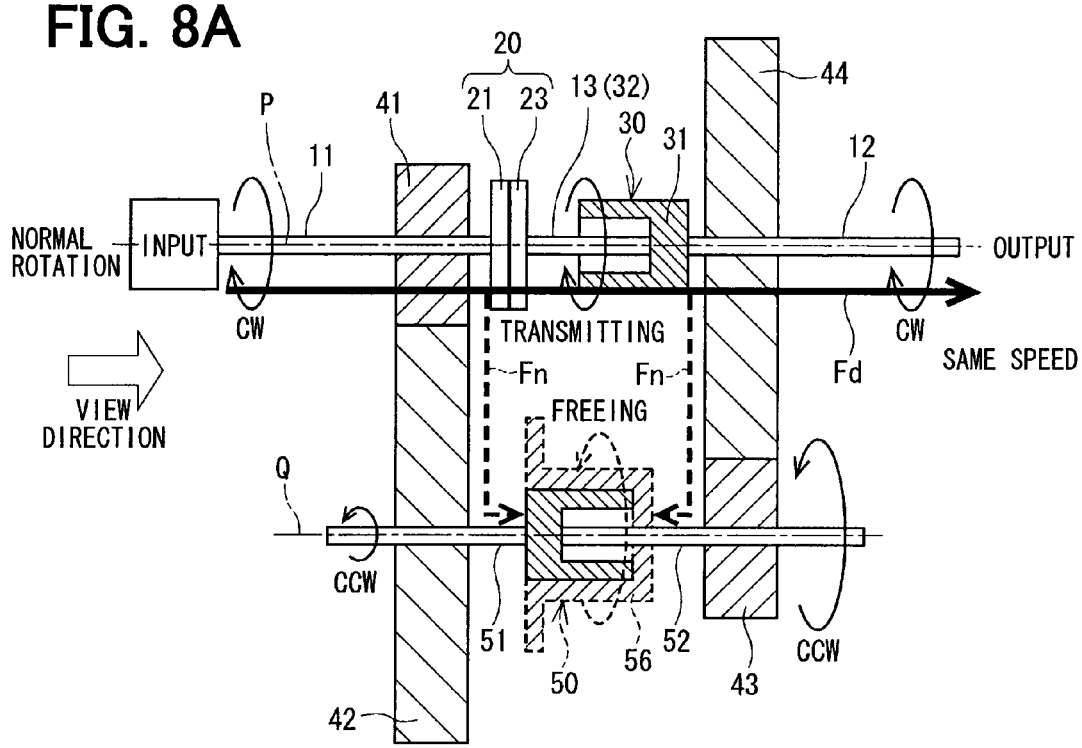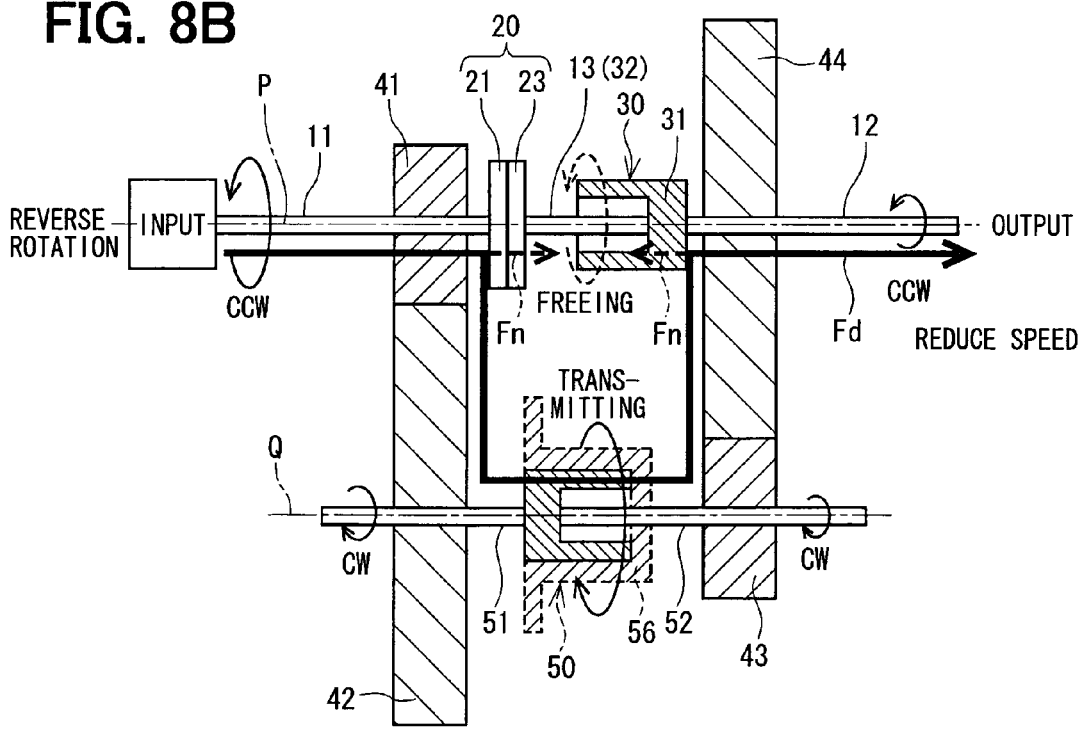

DRIVE FORCE TRANSMISSION APPARATUS

CROSS REFERENCE TO RELATED APPLICATION

This application is the U.S. national phase of International Application No. PCT/JP2012/051283 filed 16 Jan. 2012 which designated the U.S. and claims priority to Japanese Patent Application No. 2011-63012 filed on Mar. 22, 2011, the entire contents of each of which are hereby incorporated by reference.

TECHNICAL FIELD

The present invention relates to a drive force transmission apparatus.

BACKGROUND ART

A drive force transmission apparatus drives a subject mechanism, which is connected to an output shaft of the drive force transmitting apparatus, by transmitting rotation of an input shaft, which is driven with a drive force of, for example, an electric motor, to the output shaft at a rotational speed that is the same, decreased or increased relative to a rotational speed of the input shaft. In a typical drive force transmission apparatus, an input-to-output speed ratio (also referred to as a speed change ratio), which is a ratio between a rotational speed of the input shaft and a rotational speed of the output shaft, and an output characteristic of a transmitted torque, which is transmitted from the input shaft to the output shaft, are constant regardless of the rotational direction of the input shaft. However, in some cases, it is required to provide different output characteristics between the normal rotation and the reverse rotation or between forward movement and backward movement of an actuator, which serves as the subject mechanism.

For example, a loading and unloading lift requires the low speed and high torque at the time of lifting up and requires the high speed without requiring a torque at the time of lifting down. A winch requires the low speed and high torque at the time of winding up (pulling in) and requires the high speed without requiring a torque at the time of winding out (letting out). A clamp requires the high clamping force at the low speed at the time of clamping and requires the high speed without requiring a clamping force at the time of unclamping. A clutch requires the high torque and low speed at the time of compressing a spring and requires the low torque and high speed at the time of releasing in a direction of the spring force.

Furthermore, in a variable compression ratio engine, which can change a compression ratio thereof, the low speed and high torque is required at the time of changing from a low compression ratio side to a high compression ratio side, and the high speed is required without requiring a torque at the time of changing from the high compression ratio side to the low compression ratio side.

As discussed above, in the cases where the required characteristics change between the normal rotation and the reverse rotation or between the forward movement and the backward movement, the actuator having the fixed input-to-output speed ratio needs to sacrifice one of the characteristics or needs to incases the output and/or size of the motor and/or the actuator.

a technique of a transmission, such as an automatic transmission of a vehicle, which uses electronic control, is known as an apparatus and/or a method, which changes the output characteristic between the normal rotation and the reverse rotation or between the forward movement and the backward movement. Also, it is known to mechanically or electrically sense the rotational direction and to select one of different drive force transmission paths, which have different gear ratios, respectively. For example, Japanese Unexamined Patent Publication JP2006-234062A recites a two-speed transmission apparatus, which can rotate in both of a normal rotational direction and a reverse rotational direction. This two-speed transmission apparatus includes an electromagnetic clutch, which can electromagnetically couple and decouple between an output shaft of a drive device and an internal gear of a speed reducing planetary gear mechanism.

There are also disclosed the following techniques as the other apparatus and/or method.

Japanese Patent JP4333129B2 recites a variable compression ratio engine. At this engine, two one-way clutches are used to change between two drive force transmission paths. According to Japanese Patent JP4333129B2, when the drive force transmission path of a high speed reducing ratio is selected, the output of the low rotational speed and high torque is obtained. In contrast, when the drive force transmission path of a low speed reducing ratio is selected, the output of the high rotational speed and low torque is obtained.

Japanese Unexamined Patent Publication JP2009-079408A teaches an opening/closing body drive apparatus. In this opening/closing body drive apparatus, two one-way clutches are used to form the two drive force transmission paths and to enable selection between the two drive force transmission paths, like in Japanese Patent JP4333129B2.

Japanese Unexamined Patent Publication JP2004-239326A (corresponding to US2004/0152556A1) teaches an automatic reducing-ratio changing apparatus. In this automatic reducing-ratio changing apparatus, a high torque is generated at a terminal end of a forward path (outward route) of an actuator, and thereafter lock levers are moved by an abutment force to change the speed reducing ratio (reducing-ratio), so that the actuator is displaced at a high speed in the backward path (homeward route).

Japanese Unexamined Patent Publication JPH07-071558A (corresponding to U.S. Pat. No. 5,557,987) teaches a rotation transmission apparatus. In this rotation transmission apparatus, ratchets are used to select a drive force transmission path based on a rotational direction.

Japanese Unexamined Utility Model Publication JPH06-8945U teaches an automatic winding speed change mechanism for a camera. This automatic winding speed change mechanism includes an electric motor and two transmission gear systems, and a switching gear is moved upward or downward according a winding load to change a drive force transmission path, thereby automatically changing a winding speed.

However, the apparatus, which uses the electronic control, and the apparatus, which uses the mechanical or electric sensing and the drive force switching mechanism, are complicated and have the increased sizes, thereby resulting in the high costs. For example, the apparatus of Japanese Unexamined Patent Publication JP2006-234062A has the increased number of components due to the addition of a solenoid of the electromagnetic clutch and a control device, thereby resulting in the increased costs. Furthermore, a circuit, which controls the solenoid synchronously with the rotational direction of the motor, is required. A sensor and a control element are required, so that fine movement is difficult, and the operation may possibly become unreliable.

In Japanese Patent JP4333129B2 and Japanese Unexamined Patent Publication JP2009-079408A, the two one-way clutches, which limit opposite rotations, respectively, are used. The one-way clutches respectively transmit rotational forces to the two transmission paths, which have the different input-to-output speed ratios, respectively. In this way, the input-to-output speed ratio is changed according to the rotational direction. However, as discussed below, this structure cannot implement the normal rotation and the reverse rotation.

For example, in Japanese Unexamined Patent Publication JP2009-079408A, the two one-way clutches, i.e., a first one-way clutch and a second one-way clutch are provided to the output shaft. The first one-way clutch and the second one-way clutch limit opposite rotations, respectively, which are opposite to each other. The first one-way clutch drives an opening side drive gear, and the second one-way clutch drives a closing side drive gear. The opening side drive gear and the closing side drive gear are engaged with an opening side driven gear and a closing side driven gear, respectively, which are fixed to a common intermediate shaft.

With the above structure, it is now assumed that the output shaft is rotated in a drive force transmitting direction of the first one-way clutch, so that the common intermediate shaft is rotated through the gear. Then, the rotation of the intermediate shaft is transmitted to the closing side drive gear through the closing side driven gear, so that a rotational force is applied to the closing side drive gear in a rotational direction that is the same as a rotational direction of the output shaft. Here, in a case where a rotational speed of the closing side drive gear is higher than a rotational speed of the output shaft, it corresponds to a state, in which the output shaft is rotated in an opposite rotational direction that is opposite from a rotational direction of the closing side drive gear. The state, in which the output shaft is rotated in the opposite rotational direction, is a drive force transmitting state of the second one-way clutch. Therefore, the first one-way clutch and the second one-way clutch are simultaneously held in the drive force transmitting state. As a result, deadlock occurs, i.e., the drive force transmission systems interfere with each other due to the drive force transmissions at the different input-to-output speed ratios. Therefore, this mechanism cannot be properly operated, i.e., is inoperable.

Furthermore, various operational patterns have been checked for the case, in which the two one-way clutches are constructed to limit the rotations in the same rotational direction, the case, in which an inner race of the one-way clutch is driven, and the case in which an outer race of the one-way clutch is driven. Based on a result of this checking, it has been found that the deadlock occurs in all of the patterns, or the two one-way clutches are freed, i.e., are decoupled, and thereby the output shaft is not rotated. That is, the simple combination of the two one-way clutches cannot form the mechanism, which can change the input-to-output speed ratio between the time of normal rotation and the time of reverse rotation.

Furthermore, in Japanese Unexamined Patent Publication JP2004-239326A (corresponding to US2004/0152556A1), when the operation is reversed to the backward path (homeward route) before reaching the terminal end of the forward path (outward route), the speed change cannot be made.

In Japanese Unexamined Patent Publication JPH07-071558A (corresponding to U.S. Pat. No. 5,557,987), a lost torque is generate between an input shaft and an output shaft due switching of the ratchets. Also, a ratchet system, which includes the ratchets, needs to be installed to a portion of the apparatus, which is connected to an inside of the drive shaft or the drive shaft itself. Therefore, the apparatus cannot be made compact or cannot have a simple structure. Furthermore, a good rotational balance is difficult to implement, so that it is not suitable for the high speed rotation. In addition, a ratchet fitting portion is limited to a circumferential portion of the corresponding gear, so that the amount of the drive force transmission may possibly become short relative to the size of the entire apparatus.

In the speed change mechanism of Japanese Unexamined Utility Model Publication JPH06-8945U, in the middle of moving the switching gear in the upward movement or the downward movement, there is a period, during which the drive force cannot be conducted to any of the systems. Furthermore, the switching gear is moved upward or downward while being rotated, so that at the time of contacting the switching gear and the transmission gear with each other, teeth of the switching gear and teeth of the transmission gear may not possibly be engaged with each other and may possibly be repelled each other. Therefore, particularly, this cannot be applied to an apparatus, which rotates at a high rotational speed.

SUMMARY OF INVENTION

The present invention addresses the above disadvantages. Thus, it is an objective of the present invention to provide a drive force transmission apparatus, which can automatically change between drive force transmission, which results in the same rotational speed of an output shaft that is the same as a rotational speed of an input shaft, and drive force transmission, which results in a decreased rotational speed of the output shaft that is decreased from a rotational speed of the input shaft, at time of normal rotation of the input shaft and at time of reverse rotation of the input shaft, respectively.

According to the present invention, there is provided a drive force transmission apparatus, which includes an input shaft, an output shaft, an input transmitting member, an input side sub-shaft, a first transmitting member, an output side sub-shaft, a second transmitting member, an output transmitting member, a one-way rotational force transmitting member and a two-way rotational force transmitting member. The input shaft is rotatable in each of a normal rotational direction and a reverse rotational direction, which are opposite to each other. The output shaft is rotatable by a rotational force transmitted from the input shaft. The output shaft is adapted to be rotated in the normal rotational direction at a rotational speed, which is the same as a rotational speed of the input shaft when the input shaft is rotated in the normal rotational direction, and the output shaft is adapted to be rotated in the reverse rotational direction at a decreased rotational speed, which is decreased from a rotational speed of the input shaft, when the input shaft is rotated in the reverse rotational direction. The input transmitting member is fixed to the input shaft and is rotatable integrally with the input shaft. The input side sub-shaft has an axis, which is different from an axis of the input shaft. The first transmitting member is fixed to the input side sub-shaft and is rotatable integrally with the input side sub-shaft when rotation is transmitted from the input transmitting member to the first transmitting member. The output side sub-shaft has an axis, which is different from an axis of the output shaft. The second transmitting member is fixed to the output side sub-shaft and is rotatable integrally with the output side sub-shaft. The output transmitting member is fixed to the output shaft and is rotatable integrally with the output shaft when rotation is transmitted from the second transmitting member to the output transmitting member. The one-way rotational force transmitting member is placed between the input shaft and the output shaft. The one-way rotational force transmitting member transmits a rotational force from the input shaft to the output shaft when the input shaft is rotated in the normal rotational direction. The one-way rotational force transmitting member frees the output shaft to enable rotation of the input shaft relative to the output shaft when the input shaft is rotated in the reverse rotational direction. The two-way rotational force transmitting member is placed between the input side sub-shaft and the output side sub-shaft. The two-way rotational force transmitting member transmits a rotational force from the input side sub-shaft to the output side sub-shaft. The two-way rotational force transmitting member frees the input side sub-shaft to enable rotation of the output side sub-shaft relative to the input side sub-shaft upon application of a rotational force from the output side sub-shaft. The rotational force of the input shaft is transmitted to the output shaft through the one-way rotational force transmitting member when the input shaft is rotated in the normal rotational direction. The rotational force of the input shaft is transmitted to the output shaft through the input transmitting member, the first transmitting member, the input side sub-shaft, the two-way rotational force transmitting member, the output side sub-shaft, the second transmitting member and the output transmitting member when the input shaft is rotated in the reverse rotational direction.

BRIEF DESCRIPTION OF THE DRAWINGS

The invention, together with additional objectives, features and advantages thereof, will be best understood from the following description, the appended claims and the accompanying drawings in which:

FIG. 8A is a schematic diagram showing an operation of the drive force transmission apparatus of the embodiment at the time of normal rotation of the input shaft;

FIG. 8B is a schematic diagram showing an operation of the drive force transmission apparatus of the embodiment at the time of reverse rotation of the input shaft;

DESCRIPTION OF EMBODIMENT

Figure 4:
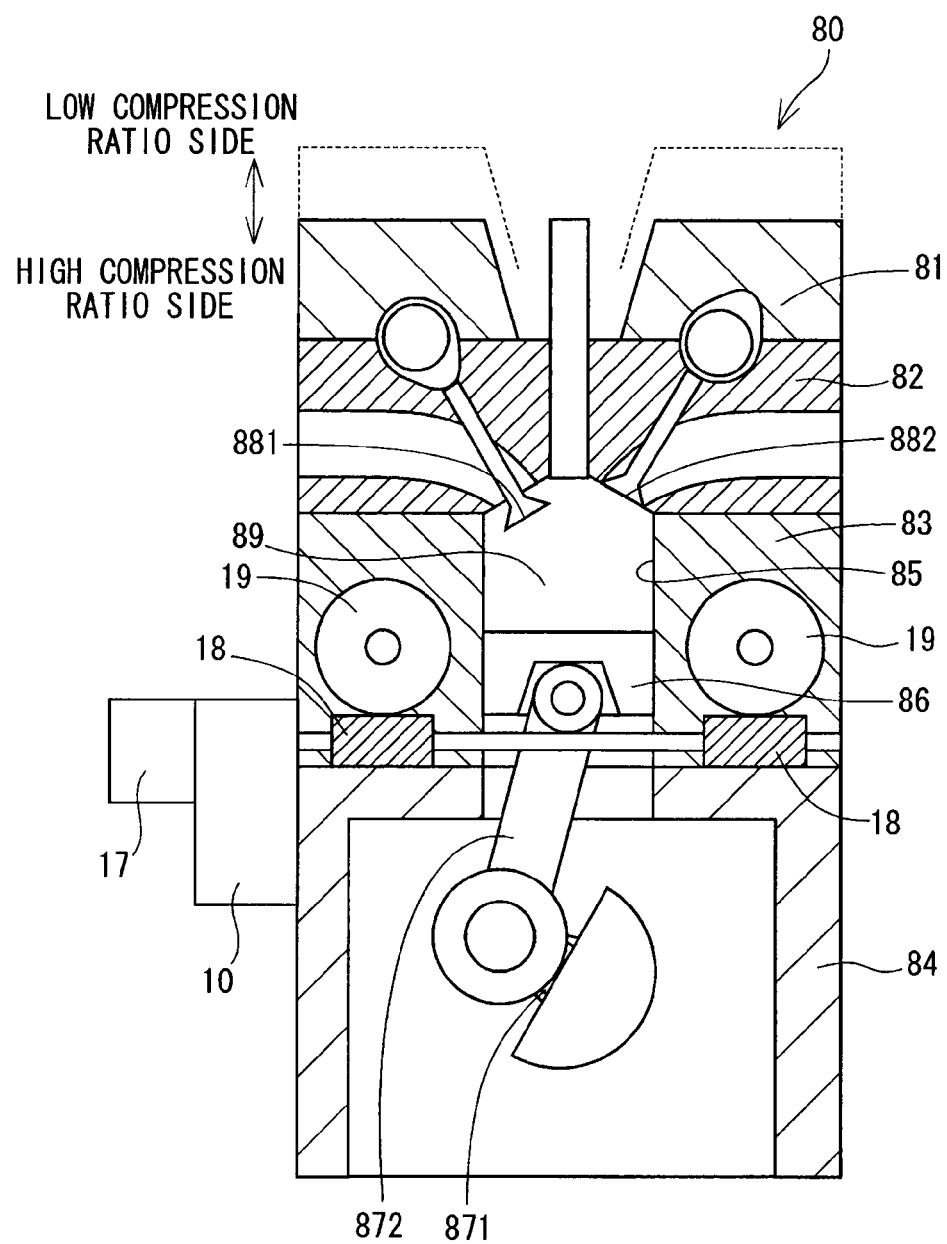
FIG. 4 is a schematic diagram of a variable compression ratio engine, in which the drive force transmission apparatus of the embodiment is applied.

According to an embodiment of the present invention, a drive force transmission apparatus of the present invention is applied to a variable compression ratio engine, which is installed in, for example, a vehicle (e.g., an automobile) and has a variable compression ratio. As shown in FIG. 4, the variable compression ratio engine 80 has a cam cover 81, a cylinder head 82, a cylinder block 83 and a lower case 84. A cylinder 85 is formed in the cylinder block 83, and a piston 86 is received in the cylinder 85 in a manner that enables reciprocation of the piston 86 in the cylinder 85. An intake valve 881 and an exhaust valve 882 are installed in the cylinder head 82. The intake valve 881 opens and closes an intake passage connected to the cylinder 85, and the exhaust valve 882 opens and closes an exhaust passage connected to the cylinder 85. A space, which is surrounded by an inner peripheral wall of the cylinder 85, an upper end of the piston 86, the intake valve 881 and the exhaust valve 882, forms a combustion chamber 89. A crankshaft 871 and a connecting rod 872 are received in the lower case 84 such that the reciprocation of the piston 86 is converted into rotation of the crankshaft 871.

Furthermore, a compression ratio change mechanism, which includes the drive force transmission apparatus 10, an electric motor 17, a plurality of worms 18 and a plurality of worm wheels 19, is provided in the cylinder block 83.

In a view taken from an input shaft side (the left side of FIG. 4) of the drive force transmission apparatus 10, rotation in a clockwise direction (CW direction) will be referred to as normal rotation, and rotation in a counterclockwise direction (CCW direction) will be referred to as reverse rotation.

At the time of normal rotation of the motor 17, the drive force transmission apparatus 10 transmits a rotational force of the motor 17 in the normal rotational direction to the worms 18 at the same rotational speed as that of the motor 17. At the time of reverse rotation of the motor 17, the drive force transmission apparatus 10 transmits a rotational force of the motor 17 in the reverse rotational direction to the worms 18 at a decreased rotational speed, which is decreased from the rotational speed of the motor 17.

In the state shown in FIG. 4, the cylinder block 83 is placed at its lowermost operational position relative to the lower case 84. At this time, a volume of the combustion chamber 89 is minimum, and a change in the volume of the combustion chamber 89, which occurs upon the movement of the piston 86, is maximum. Thus, the operational state of the engine becomes a state of a high compression ratio (hereinafter referred to a high compression ratio state).

When the rotational force of the motor 17 in the normal rotational direction is transmitted to the worms 18, the cam cover 81, the cylinder head 82 and the cylinder block 83 are moved upward relative to the lower case 84, and an operational position of an upper end of the cam cover 81 is moved to a location indicated with a dotted line in FIG. 4. In this way, the volume of the combustion chamber 89 is increased, and thereby a change in the volume of the combustion chamber 89, which occurs upon the movement of the piston 86, is decreased. Thus, the operational state of the engine becomes a state of a low compression ratio (hereinafter referred to as a low compression ratio state). An application direction of a combustion pressure of the combustion chamber 89 to the cylinder block 83 is the same as the moving direction of the cam cover 81, the cylinder head 82 and the cylinder block 83 at the time of occurrence of the change from the high compression ratio side (state) to the low compression ratio side (state). Therefore, a large drive force is not required. As a result, the drive force transmission apparatus 10 can rapidly move the cylinder block 83 by transmitting the rotation of the motor 17 to the worms 18 at the same rotational speed as that of the motor 17.

Next, when the rotational force of the motor 17 in the reverse rotational direction is transmitted to the worms 18, the cam cover 81, the cylinder head 82 and the cylinder block 83 are moved downward relative to the lower case 84. In this way, the volume of the combustion chamber 89 is decreased, and thereby a change in the volume of the combustion chamber 89, which occurs upon the movement of the piston 86, is increased. Thus, the operational state of the engine becomes the high compression ratio state. At a transition period from the low compression ratio side (state) to the high compression ratio side (state), the cylinder block 83 needs to be lowered against the combustion pressure of the combustion chamber 89. Therefore, the drive force transmission apparatus 10 decreases the speed of the rotation transmitted from the motor 17 and thereby outputs a high torque.

Next, the structure of the drive force transmission apparatus 10 will be described with reference to FIGS. 1 to 3 and 5A to 7E.

Figure 1:
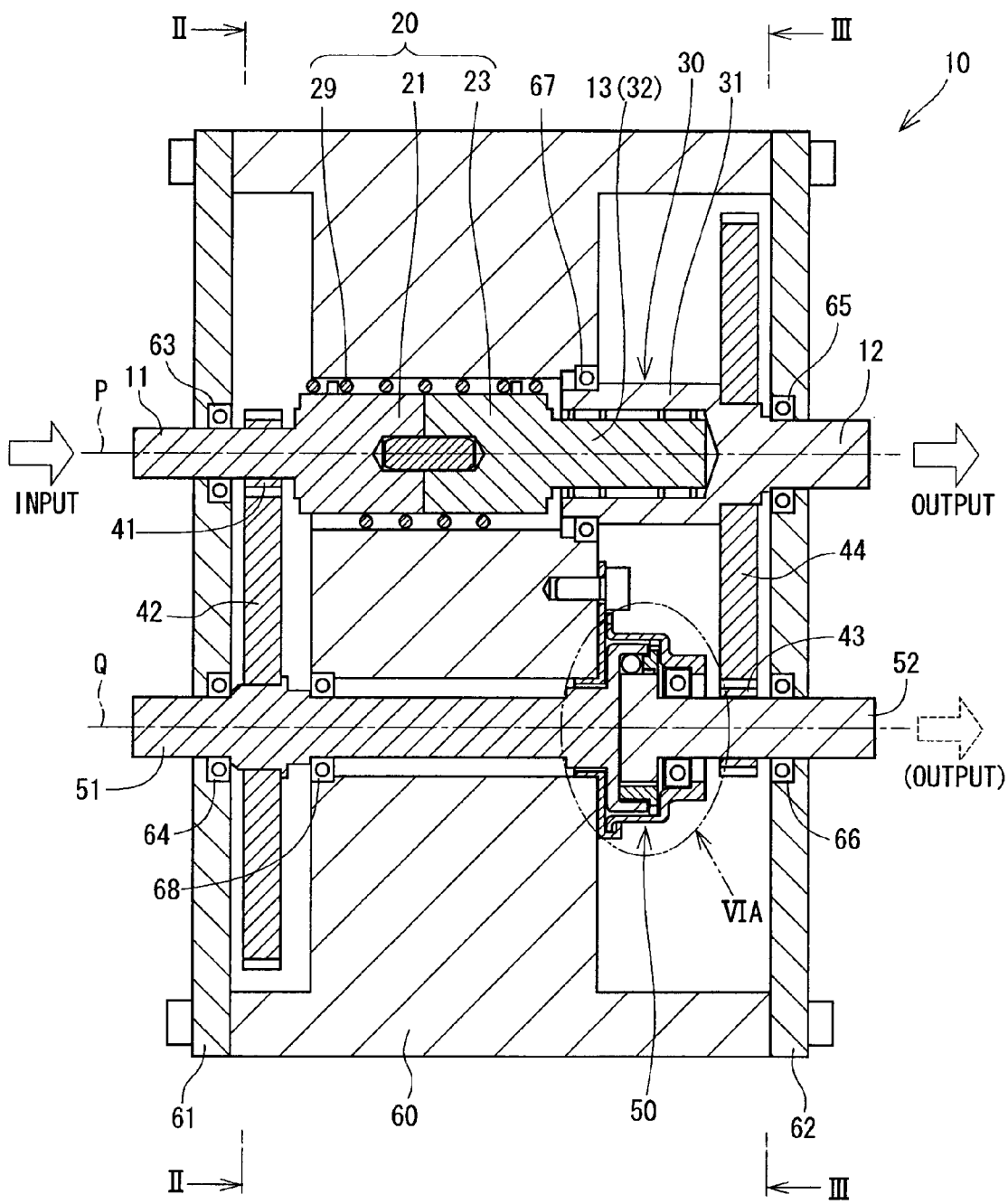
FIG. 1 is a cross-sectional view of a drive force transmission apparatus according to an embodiment of the present invention.
Figure 2:
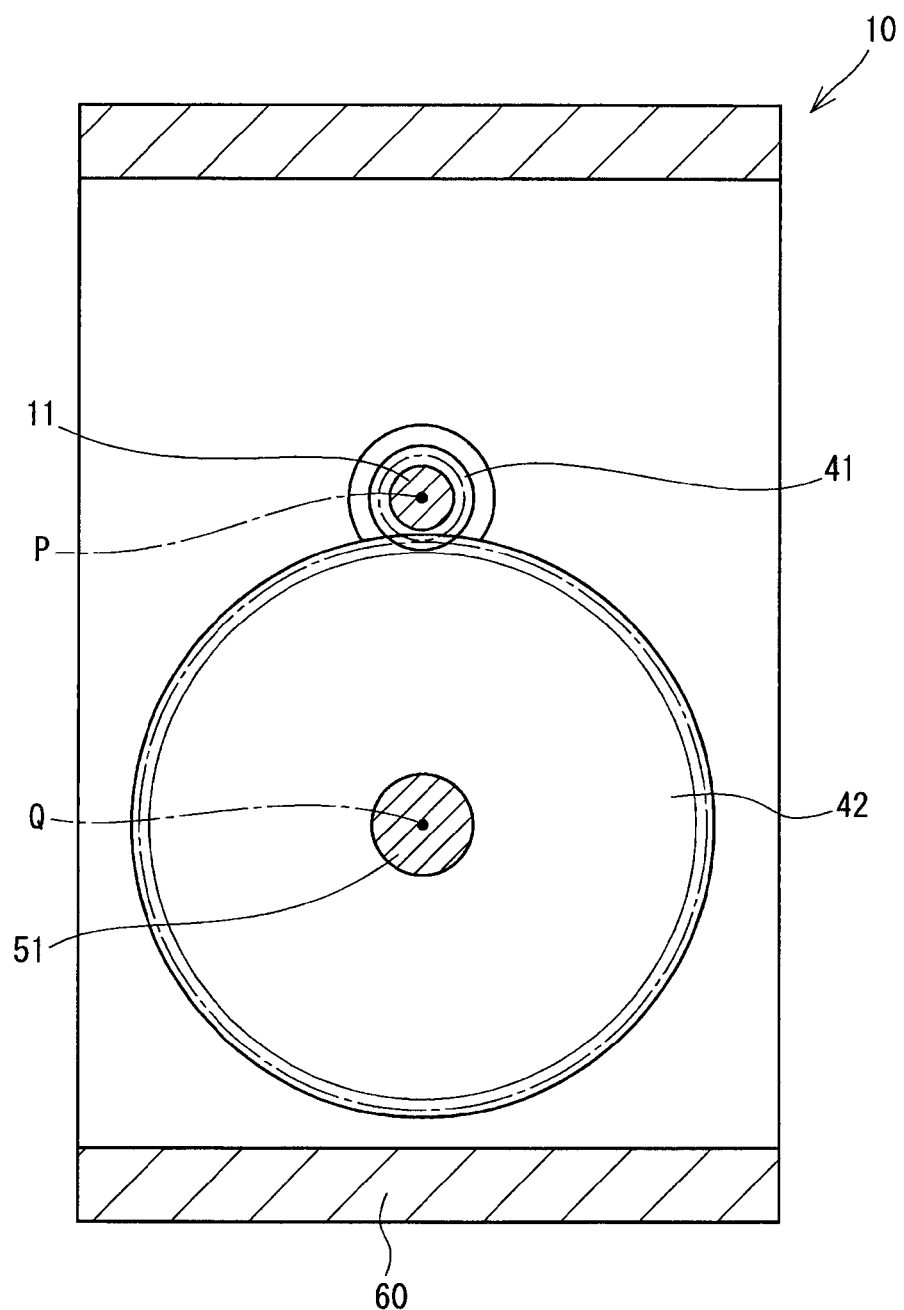
FIG. 2 is a cross-sectional view taken along line II-II in FIG. 1.
Figure 3:
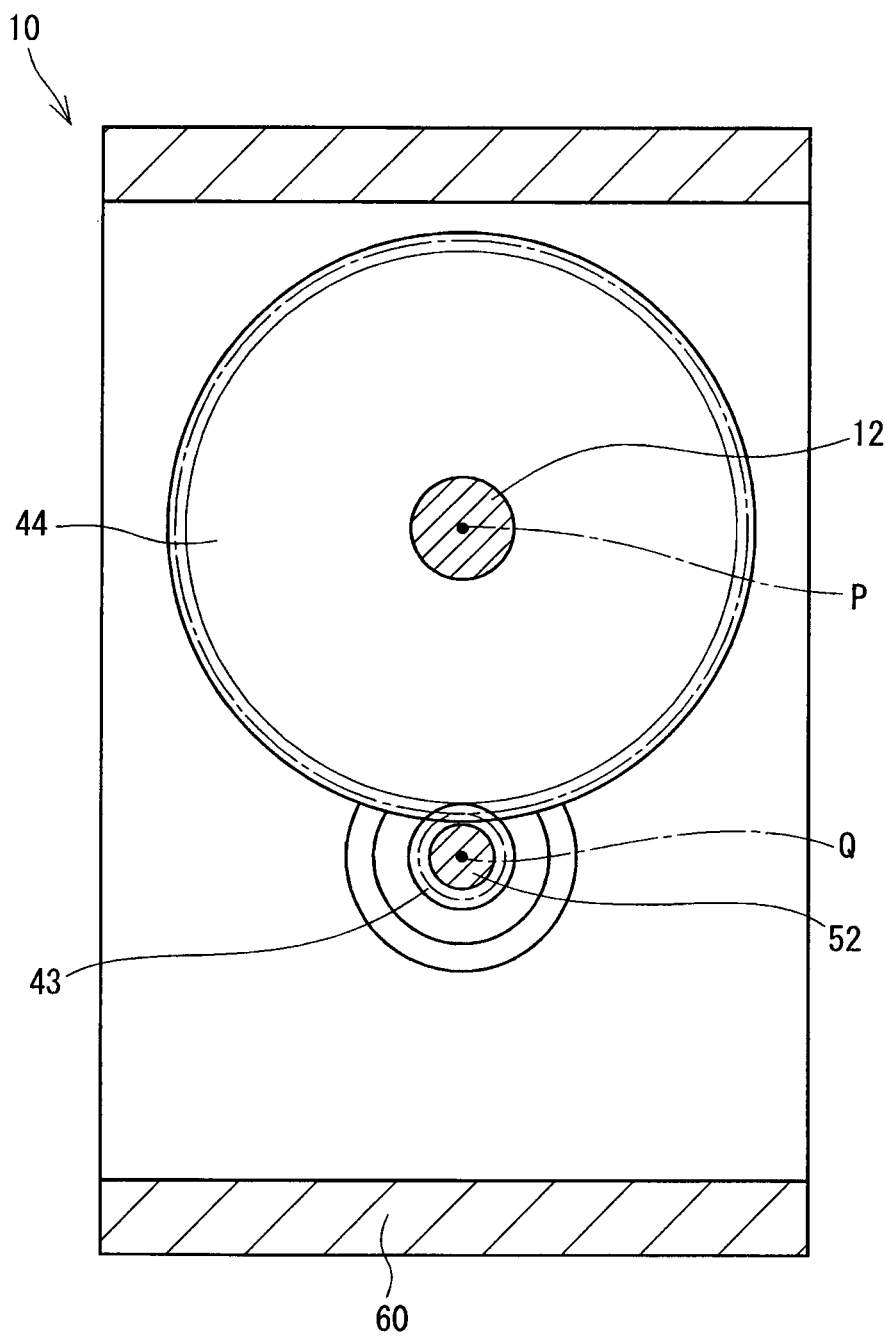
FIG. 3 is a cross-sectional view taken along line III-III in FIG. 1.

As shown in FIGS. 1 to 3, the drive force transmission apparatus 10 includes a housing 60, an input side support plate 61, an output side support plate 62, an input shaft 11, an output shaft 12, an input side sub-shaft 51 and an output side sub-shaft 52. The input shaft 11 and the input side sub-shaft 51 are rotatably supported by bearings 63, 64, respectively, which are fixed to the input side support plate 61. The output shaft 12 and the output side sub-shaft 52 are rotatably supported by bearings 65, 66, respectively, which are fixed to the output side support plate 62. Furthermore, the output shaft 12 is rotatably supported by a bearing 67, which is fixed to the housing 60. The input side sub-shaft 51 is rotatably supported by a bearing 68, which is fixed to the housing 60.

The input shaft 11 and the output shaft 12 are rotatable about a rotational axis P. The input side sub-shaft 51 and the output side sub-shaft 52 are rotatable about a rotational axis Q, which is generally parallel to the rotational axis P. The input shaft 11 is connected to a power source, such as the electric motor. The output shaft 12 is connected to a subject mechanism, such as the actuator. In addition to or in place of the output shaft 12, the output side sub-shaft 52 may be connected to the subject mechanism.

The input shaft 11 and the output shaft 12 are connected with each other through a coupling 20 and a one-way clutch 30. The coupling 20 includes an input rotor 21, an intermediate rotor 23 and a spring 29 and generates a rotational time lag between the input shaft 11 and an intermediate shaft 13. The one-way clutch 30 includes the intermediate shaft 13 and an outer race 31. The intermediate shaft 13 is formed integrally with the intermediate rotor 23 and forms an inner race 32. The outer race 31 is formed integrally with the output shaft 12. At the time of the normal rotation of the input shaft 11, the one-way clutch 30 transmits the rotational force of the intermediate shaft 13 in the normal rotational direction to the output shaft 12. At the time of the reverse rotation of the input shaft 11, the one-way clutch 30 frees the output shaft 12 from the intermediate shaft 13 to enable rotation of the intermediate shaft 13 relative to the output shaft 12. Furthermore, the input side sub-shaft 51 and the output side sub-shaft 52 are connected to each other through a two-way clutch 50. The coupling 20, the one-way clutch 30 and the two-way clutch 50 will be described in detail later.

An input gear 41 is fixed to the input shaft 11, and a first gear 42 is fixed to the input side sub-shaft 51. Furthermore, a second gear 43 is fixed to the output side sub-shaft 52, and an output gear 44 is fixed to the output shaft 12. The input gear 41, the first gear 42, the second gear 43 and the output gear 44 are formed as spur gears, respectively. The input gear 41 and the first gear 42 are meshed, i.e., are engaged with each other, and the second gear 43 and the output gear 44 are meshed, i.e., engaged with each other. The number of teeth of the first gear 42 is larger than the number of teeth of the input gear 41. A diameter of a pitch circle of the first gear 42 is larger than a diameter of a pitch circle of the input gear 41. Thus, the rotation of the input shaft 11 is transmitted to the input side sub-shaft 51 such that the direction of the rotation of the input side sub-shaft 51 becomes opposite from the direction of the rotation of the input shaft 11, and the speed of the rotation of the input side sub-shaft 51 is decreased from the speed of the rotation of the input shaft 11. Furthermore, the number of teeth of the output gear 44 is larger than the number of teeth of the second gear 43, and a diameter of a pitch circle of the output gear 44 is larger than a diameter of a pitch circle of the second gear 43. Thus, the rotation of the output side sub-shaft 52 is transmitted to the output shaft 12 such that the direction of the rotation of the output shaft 12 becomes opposite from the direction of the rotation of the output side sub-shaft 52, and the speed of the rotation of the output shaft 12 is decreased from the speed of the rotation of the output side sub-shaft 52.

Now, the structure of the one-way clutch 30 will be described with reference to FIGS. 5A to 5F.

The one-way clutch 30 includes the outer race 31, the inner race 32, a plurality of rollers 33 and a plurality of springs 34. The rollers 33 are arranged in an annular gap, which is radially defined between the outer race 31 and the inner race 32. A plurality of wedges 31a is formed in an inner peripheral wall of the outer race 31 to correspond with the rollers 33, respectively. Each roller 33 is adapted to be clamped between the corresponding wedge 31a and the inner race 32 at one circumferential side part (clockwise side part in FIGS. 5A-5F) of the wedge 31a and is adapted to be released to be free at the other circumferential side part (counterclockwise side part in FIGS. 5A-5F) of the wedge 31a. Each spring 34 is placed at a corresponding location between corresponding circumferentially adjacent two of the rollers 33 to urge the corresponding one of the rollers 33 against the outer race 31.

Figure 5A:
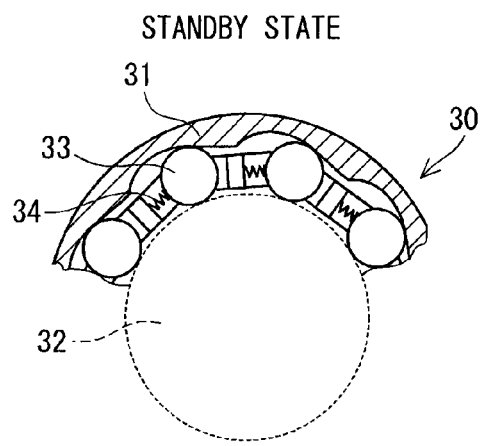
FIGS. 5A to 5F are schematic diagrams indicating various operational states of a one-way clutch of the drive force transmission apparatus of the embodiment.

In a standby state shown in FIG. 5A, the outer race 31 and the inner race 32 are stopped, and each roller 33 is urged against the corresponding wedge 31a.

Figure 5B:
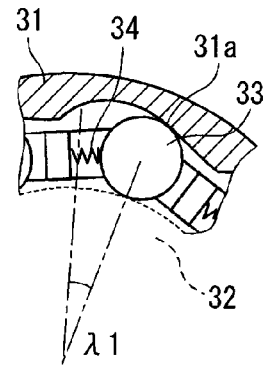
Figure 5C:
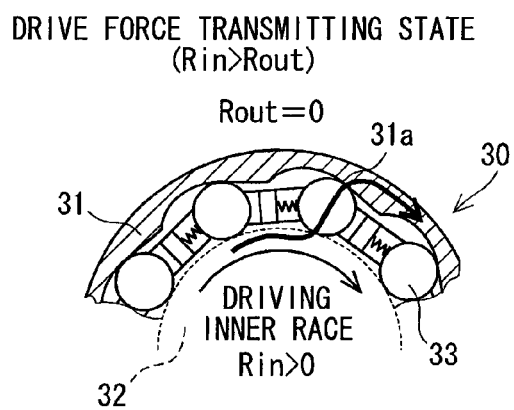
Figure 5D:
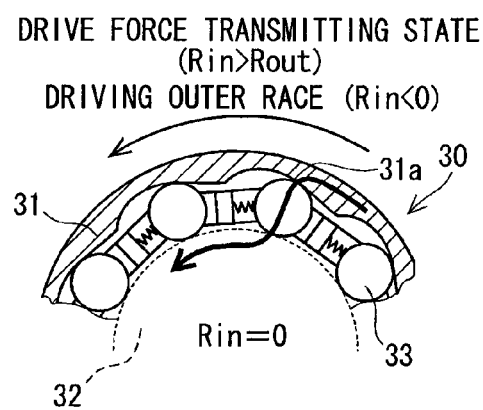

FIG. 5C shows a case where the inner race 32, which now serves as a driving-side shaft, is driven to rotate in the clockwise direction relative to the outer race 31. FIG. 5D shows a case where the outer race 31, which now serves as a driving-side shaft, is driven to rotate in the counterclockwise direction relative to the inner race 32. In each of these cases shown in FIGS. 5C and 5D, as indicated by a solid arrow, each roller 33 is clamped between the corresponding wedge 31a and the inner race 32, so that the rotational force of the driving-side shaft is transmitted to a driven-side shaft, which is driven by the driving-side shaft, through the rollers 33. Here, a drive force transmitting state, in which the drive force is transmitted from the driving-side shaft to the driven-side shaft, is established when a relationship of Rin>Rout is satisfied. Here, Rin denotes the rotational speed of the inner race 32, and Rout denotes the rotational speed of the outer race 31. Furthermore, the rotation in the clockwise direction is positive (i.e., the rotational speed of the rotation in the clockwise direction is a positive value), and the rotation in the counterclockwise direction is negative (i.e., the rotational speed of the rotation in the counterclockwise direction is a negative value).

Figure 5E:
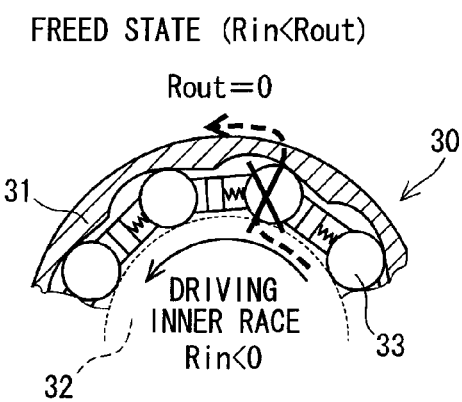
Figure 5F:
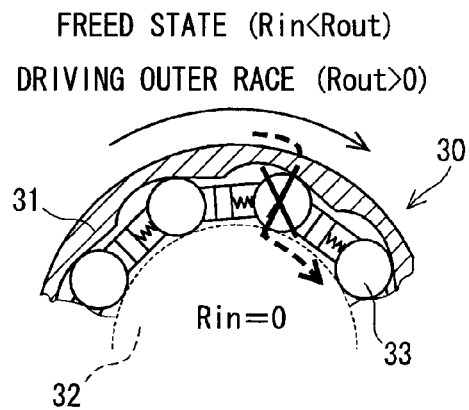

FIG. 5E shows a case where the inner race 32, which now serves as the driving-side shaft, is driven to rotate in the counterclockwise direction relative to the outer race 31. FIG. 5F shows a case where the outer race 31, which now serves as the driving-side shaft, is driven to rotate in the clockwise direction relative to the inner race 32. In each of these cases, as indicated by a dotted arrow and X in FIGS. 5E and 5F, each roller 33 is slid between the outer race 31 and the inner race 32, and thereby the rotational force of the driving-side shaft is not transmitted to the driven-side shaft. Specifically, the driven-side shaft is freed to enable rotation of the driving-side shaft relative to the driven-side shaft. Specifically, when the relationship of Rin <Rout is established, the freed state of the driven-side shaft is established (establishment of the decoupled state).

In summary, each of the drive force transmitting state (coupled state) and the freed state (decoupled state) occurs depending on the direction of the relative rotation between the outer race 31 and the inner race 32 including the relative rotation, in which one of the outer race 31 and the inner race 32 is stopped.

Furthermore, as shown in FIG. 5B, the rotation of a predetermined switching angle $\lambda 1$ is required when the operational state is changed from the freed state (decoupled state), in which each roller 33 is released from the wedge 31a, to the drive force transmitting state (coupled state), in which the roller 33 is clamped by the wedge 31a, and vice versa. The switching angle $\lambda 1$ corresponds to a backlash.

Next, the structure of the two-way clutch 50 will be described in detail with reference to FIGS. 6A to 6C.

Figure 6A:
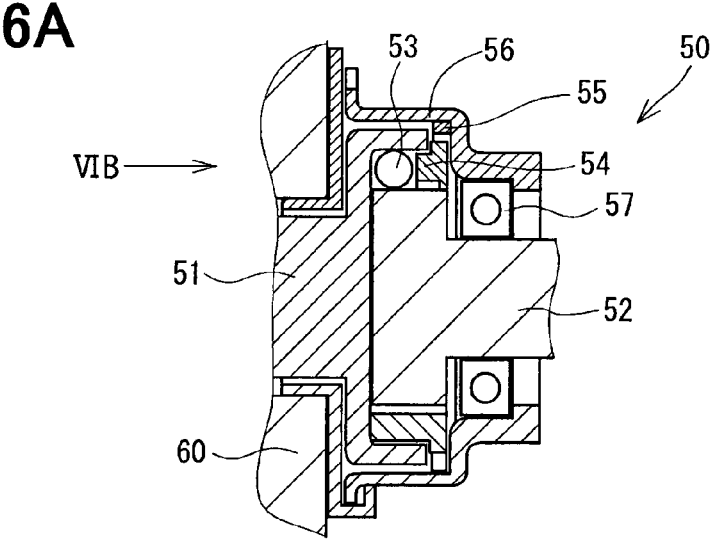
FIG. 6A is a partial enlarged view of an area indicated with an arrow VIA in FIG. 1, showing a structure of a two-way clutch of the drive force transmission apparatus.

With reference to FIG. 6A, which is a partial enlarged view of an area indicated by an arrow VIA in FIG. 1, the two-way clutch 50 includes the input side sub-shaft 51 (forming the outer race), the output side sub-shaft 52 (forming the inner race), a plurality of rollers 53, a retainer 54, a slide spring 55 and a case 56.

The retainer 54 retains the rollers 53. Radially inner end portions 55a of the slide spring 55 are engaged with the retainer 54, and a slide portion 55b of the slide spring 55, which is located on a radially outer side of the radially inner end portions 55a, contacts an inner peripheral wall of the case 56 and is urged against the inner peripheral wall of the case 56. The case 56 is fixed to the housing 60 and holds an outer peripheral portion of the input side sub-shaft 51. Furthermore, the case 56 rotatably supports the output side sub-shaft 52 through a bearing 57.

Figure 6B:
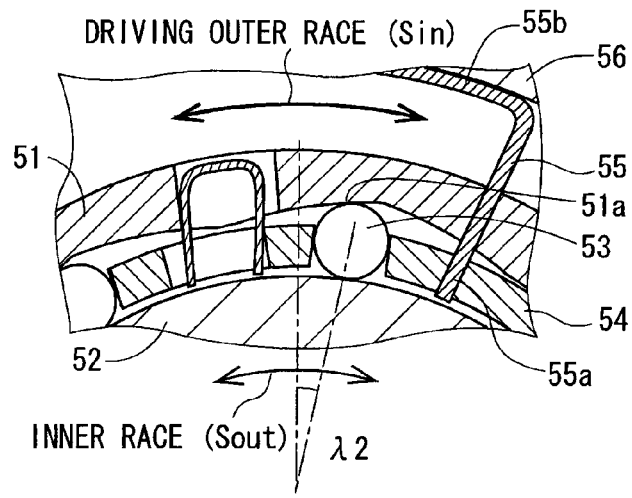
FIGS. 6B and 6C are views taken in a direction of an arrow VIB in FIG. 6A, showing two different operational states of the two-way clutch of the drive force transmission apparatus.

FIG. 6B shows a case where the input side sub-shaft (outer race) 51 is rotated as the driving-side shaft. At this time, rotation of the retainer 54 in the rotational direction of the input side sub-shaft (the outer race) 51 is resisted due to presence of a slide resistance between the case 56 and the slide spring 55. Therefore, relative rotation of each roller 53 in an opposite direction, which is opposite from the rotational direction of the input side sub-shaft 51, occurs. When the roller 53 is clamped between the corresponding wedge 51a and the output side sub-shaft 52 (inner race) upon the relative rotation of the roller 53 in the direction opposite from the rotational direction of the input side sub-shaft 51, the rotation of the input side sub-shaft 51 is transmitted to the output side sub-shaft 52 through the roller 53. A rotational force is transmitted from the input side sub-shaft 51 to the output side sub-shaft 52 when a relationship of Sin>Sout is satisfied regardless of the rotational direction of the input side sub-shaft 51. Here, Sin denotes the rotational speed of the input side sub-shaft 51, and Sout denotes the rotational speed of the output side sub-shaft 52.

Figure 6C:
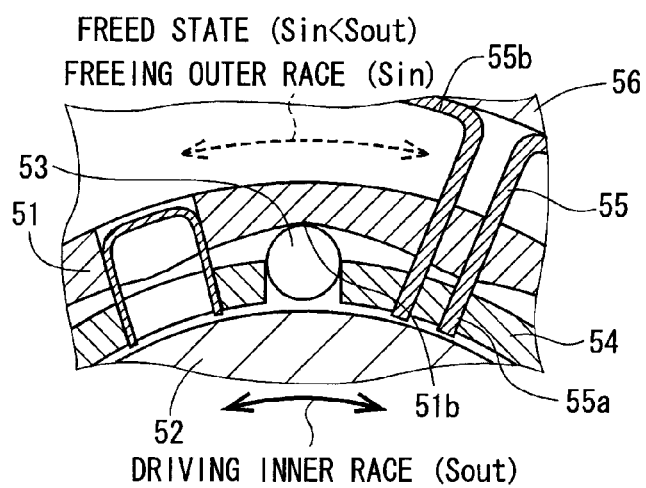

FIG. 6C shows a case where the output side sub-shaft (inner race) 52 is rotated as the driving-side shaft. At this time, the retainer 54 and the input side sub-shaft 51 do not move. Each roller 53 is placed in a corresponding recess 51b of the input side sub-shaft 51, which is radially outwardly recessed in an inner peripheral surface of the input side sub-shaft 51. Therefore, the roller 53 cannot be clamped between the input side sub-shaft 51 and the output side sub-shaft 52, and thereby only the output side sub-shaft 52 is rotated. As a result, the rotational force is not transmitted from the output side sub-shaft 52 to the input side sub-shaft 51 regardless of the rotational direction of the output side sub-shaft 52 when the relationship of Sin<Sout is satisfied. Thus, the input side sub-shaft 51 is freed from the output side sub-shaft 52 to enable rotation of the output side sub-shaft 52 relative to the input side sub-shaft 51.

Furthermore, similar to the one-way clutch 30, the rotation of a predetermined switching angle $\lambda 2$, which corresponds to a backlash, is required when the operational state of the two-way clutch 50 is changed from the freed state (decoupled state) to the drive force transmitting state (coupled state), and vice versa.

Next, the structure of the coupling 20 will be described in detail with reference to FIGS. 7A to 7E.

Figure 7A:
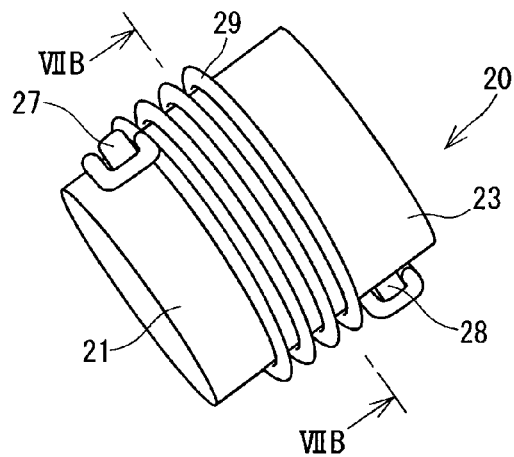
FIG. 7A is a perspective view showing a coupling of the drive force transmission apparatus of the embodiment.

As shown in FIG. 7A, the coupling 20 includes the input rotor 21, the intermediate rotor 23 and the spring 29. The input rotor 21 is configured into a cylindrical form. The spring 29 is a coil spring. The input rotor 21 is formed coaxially and integrally with the input shaft 11. The intermediate rotor 23 is formed coaxially and integrally with the intermediate shaft 13.

Figure 7B:
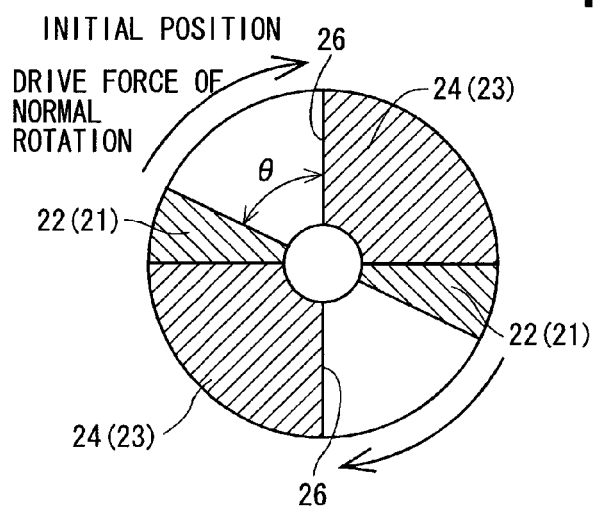
FIGS. 7B and 7C are schematic cross-sectional views taken along line VIIB-VIIB in FIG. 7A, showing operational states at time of changing an operational state of an input shaft from a stop state to a normal rotation according to the embodiment.

As shown in FIG. 7B, the input rotor 21 includes a plurality (two in this instance) of projections 22, which axially project from an intermediate rotor 23 side end surface of the input rotor 21. Each projection 22 is configured into a sector shape. The intermediate rotor 23 includes a plurality (two in this instance) of stoppers 24, which are formed in an input rotor 21 side end surface of the intermediate rotor 23. Each stopper 24 is configured into a sector shape. The projections 22 are arranged symmetrically about the rotational axis P, and the stoppers 24 are arranged symmetrically about the rotational axis P. Each projection 22 is circumferentially placed between the stoppers 24 such that relative rotation of the projection 22 relative to the stoppers 24 is enabled within a predetermined play angle $\theta$.

Figure 7C:
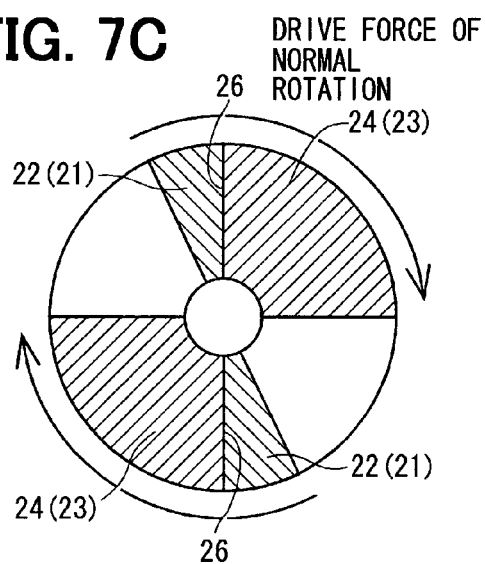

Specifically, the relative rotation of the projection 22 from an initial position, at which the projection 22 contacts a clockwise side outer wall 25 of the stopper 24, to a limit position, at which the projection 22 contacts a counterclockwise side outer wall 26 of the stopper 24, is enabled through the play angle $\theta$. When each projection 22 reaches the limit position thereof at the time of the normal rotation of the input rotor 21, the projection 22 contacts the outer wall 26 of the stopper 26 to rotate integrally therewith, as shown in FIG. 7C. In this way, the transmission of the drive force from the input rotor 21 to the intermediate rotor 23 is enabled.

Figure 7D:
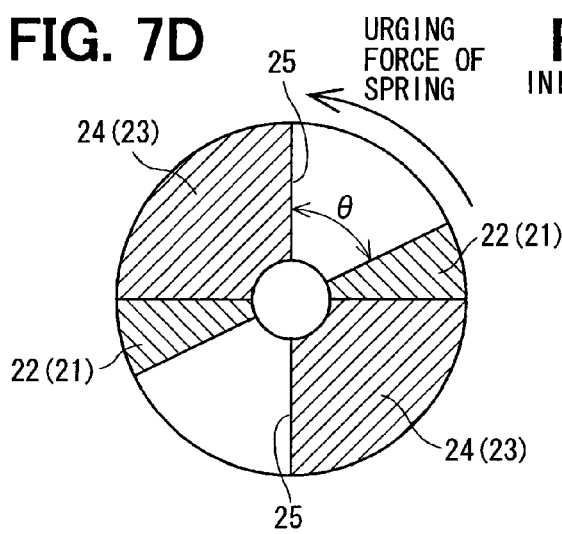
FIGS. 7D and 7E are schematic cross-sectional views taken along line VIIB-VIIB in FIG. 7A, showing operational states at time of changing an operational state of an input shaft from the normal rotation to a stopped state or reverse rotation according to the embodiment.
Figure 7E:
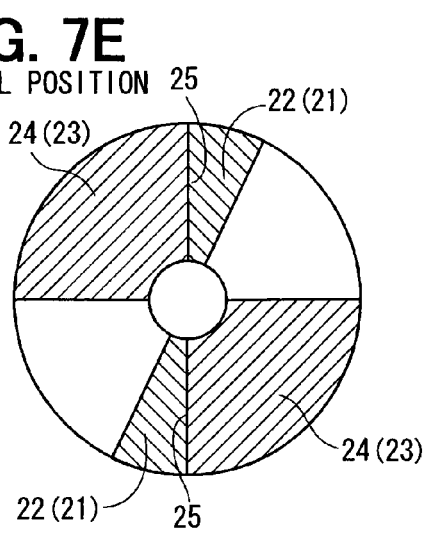

As shown in FIG. 7A, two ends of the spring 29 are engaged with two claws 27, 28, respectively, which are formed in the outer peripheral surface of the input rotor 21 and the outer peripheral surface of the intermediate rotor 23, respectively. When the input rotor 21 is rotated from the initial position in the normal rotational direction relative to the intermediate rotor 23, the spring 29 is pulled in the normal rotational direction to generate a load. Therefore, as shown in FIGS. 7D and 7E, when the normal rotation of the input rotor 21 is stopped or is changed to the reverse rotation, the spring 29 urges the input rotor 21 in the counterclockwise direction relative to the intermediate rotor 23 (see FIG. 7D), so that each projection 22 is returned to the initial position thereof, at which the play angle θ is provided between the projection 22 and the stopper 24 (see FIG. 7E).

In the present embodiment, the input gear 41, the first gear 42, the second gear 43 and the output gear 44 serve as an input transmitting member, a first transmitting member, a second transmitting member and an output transmitting member, respectively. Furthermore, the one-way clutch 30 serves as a one-way rotational force transmitting member, and the two-way clutch 50 serves as a two-way rotational force transmitting member. Furthermore, the coupling 20 serves as an idler coupler member.

Next, the operation of the drive force transmission apparatus 10 will be described with reference to FIGS. 8A to 9B. In FIGS. 8A and 8B, a bold solid line indicates a transmitted drive force Fd, and an intermediate-width dotted line indicates a non-drive force Fn, which is a rotational force other than the drive force Fd. Furthermore, a narrow solid line with an arrow head indicates the clockwise (CW) direction or the counterclockwise (CCW) direction.

As shown in FIG. 8A, when the input shaft 11 is rotated in the normal rotational direction (the clockwise direction, i.e., CW direction), the rotational force of the input shaft 11 in the normal rotational direction is transmitted to the intermediate shaft 13 through the coupling 20. Therefore, the rotational speed Rin of the inner race 32 of the one-way clutch 30 is the positive value. As a result, when the rotational speed Rout of the outer race 31 is regarded as zero, the relationship of Rin>Rout is satisfied. Therefore, the rotational force of the input shaft 11 in the normal rotational direction (the clockwise direction, i.e., CW direction) is transmitted to the output shaft 12 though the one-way clutch 30 to rotate the output shaft 12 in the normal rotational direction (the clockwise direction, i.e., CW direction) at the same rotational speed as that of the motor 17 and the input shaft 11 (see FIG. 5C).

At this time, the input side sub-shaft 51 is rotated in the reverse rotational direction (the counterclockwise direction, i.e., CCW direction) at the decreased rotational speed, which is decreased from the rotational speed of the input shaft 11, due to the engagement between the input gear 41 and the first gear 42. In contrast, the output side sub-shaft 52 is rotated in the reverse rotational direction (the counterclockwise direction, i.e., CCW direction) at the increased rotational speed, which is increased from the rotational speed of the input shaft 11 and the output shaft 12, due to the engagement between the output gear 44 and the second gear 43. Thereby, in the two-way clutch 50, the rotational speed Sout of the inner race (output side sub-shaft) 52 becomes higher than the rotational speed Sin of the outer race (the input side sub-shaft) 51 to satisfy the relationship of Sin<Sout. As a result, the output side sub-shaft 52 is freed from the input side sub-shaft 51 to enable relative rotation between the output side sub-shaft 52 and the input side sub-shaft 51 (see FIG. 6C).

In contrast, as shown in FIG. 8B, when the input shaft 11 is rotated in the reverse rotational direction (the counterclockwise direction, i.e., CCW direction), the input side sub-shaft 51 is rotated in the normal rotational direction (the clockwise direction, i.e., CW direction) at the decreased speed, which is decreased from the rotational speed of the input shaft 11, due to the engagement between the input gear 41 and the first gear 42. Thereby, in the two-way clutch 50, since the inner race (output side sub-shaft) 52 is stopped, the rotational speed Sin of the outer race (input side sub-shaft) 51 becomes higher than the rotational speed Sout of the inner race (output side sub-shaft) 52 to satisfy the relationship of Sin>Sout. Therefore, the rotational force of the input side sub-shaft 51 in the normal rotational direction (the clockwise direction, i.e., CW direction) is transmitted to the output side sub-shaft 52 (see FIG. 6B). Then, the output shaft 12 is rotated in the reverse rotational direction (the counterclockwise direction, i.e., CCW direction) at the decreased rotational speed due to the engagement between the second gear 43 and the output gear 44. As a result, the rotational force of the input shaft 11 in the reverse rotational direction is transmitted to the output shaft 12 at the decreased speed, which is decreased from the rotational speed of the input shaft 11.

At this time, the rotational force of the input shaft 11 in the reverse rotational direction (the counterclockwise direction, i.e., CCW direction) is transmitted to the intermediate shaft 13 through the coupling 20. However, in the one-way clutch 30, the rotational speed Rin of the inner race 32 is the negative value. As a result, when the rotational speed Rout of the outer race 31 is regarded as zero, the relationship of Rin<Rout is satisfied. Therefore, the output shaft 12 is freed from the intermediate shaft 13 to enable the relative rotation between the output shaft 12 and the intermediate shaft 13 (see FIG. 5E).

Figure 9A:
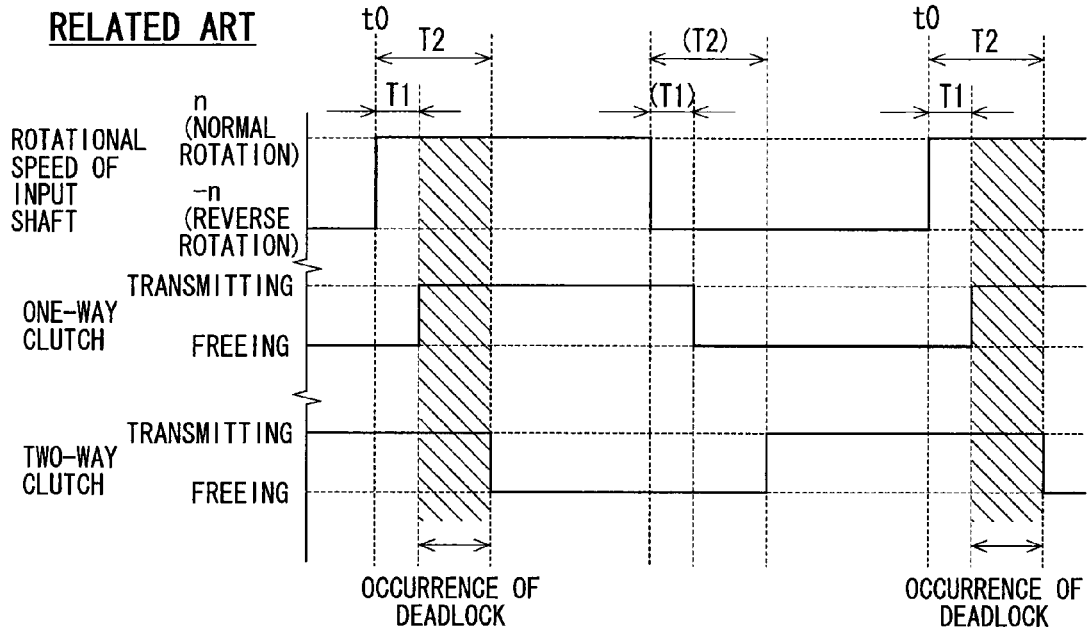
FIG. 9A is a diagram showing a timing chart for a drive force transmission apparatus of a comparative example.
Figure 9B:
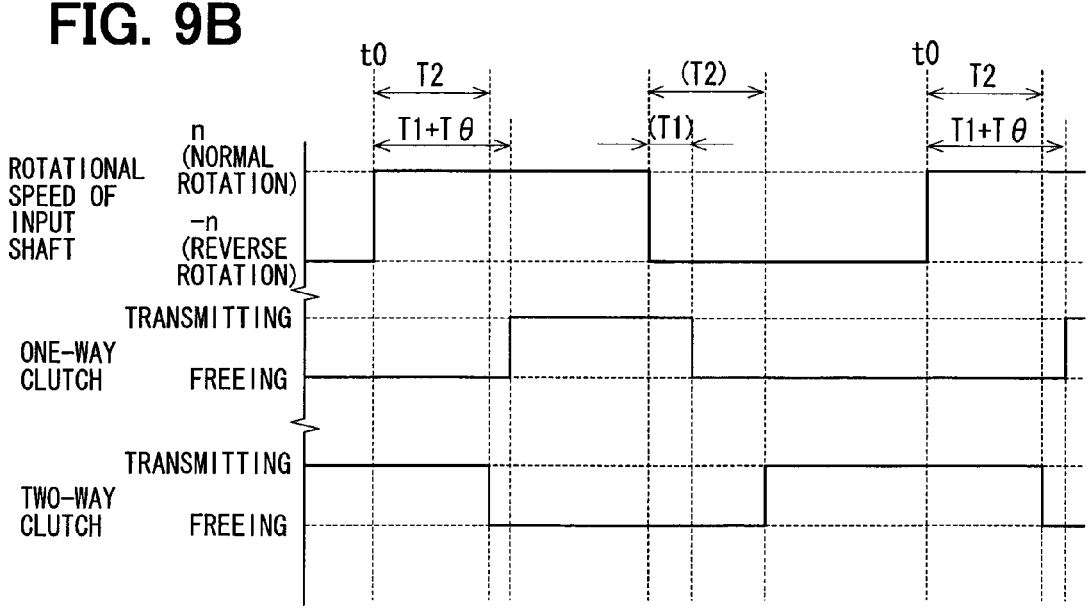
FIG. 9B is a diagram showing a timing chart of the drive force transmission apparatus according to the embodiment of the present invention.

Next, with reference to FIGS. 9A and 9B, the operation at the time of changing the rotation of the input shaft 11 from the reverse rotation to the normal rotation will be described. FIG. 9A shows a timing chart for a drive force transmission apparatus of a comparative example, which does not have the coupling.

The relevant parameters are defined as follows.

n(1/s): the number of rotations of the input shaft 11 per second, i.e., the rotational speed of the input shaft 11 (a positive value in the case of the normal rotation, and a negative value in the case of the reverse rotation).

λ1 (degrees): the switching angle of the one-way clutch 30

λ2 (degrees): the switching angle of the two-way clutch 50

Z(−): an input side speed reducing ratio (=(the number of teeth of the first gear 42/the number of teeth of the input gear 41)=(the rotational speed of the input shaft 11 and the intermediate shaft 13/the rotational speed of the input side sub-shaft 51). The input side speed reducing ratio is also referred to as an input side speed change ratio.

T1 (seconds): a time period required for the intermediate shaft 13 (=the inner race 32 of the one-way clutch 30) to rotate through the switching angle λ1

T2 (seconds): a time period required for the input shaft 11 and the intermediate shaft 13 to rotate through the angle of Z×λ2 in response to rotation of the input side sub-shaft 51 (=the outer race of the two-way clutch 50) through the switching angle λ2

The time period T1 and the time period T2 are expressed with the following equations (1) and (2).

$$T1 = \lambda 1/(360 \cdot n) \qquad \text{Equation (1)}$$

$$T2 = Z \times \lambda 2/(360 \cdot n) \qquad \text{Equation (2)}$$

Therefore, at the time of Z×λ2>λ1, the relationship of T2>T1 is satisfied as indicated in FIG. 9A. In a case where a time point of changing the rotation of the input shaft 11 from the reverse rotation to the normal rotation is t0, the operational state of the one-way clutch 30 is changed from the freed state (decoupled state) to the drive force transmitting state (coupled state) upon elapse of the time period T1 from the time point t0, and the operational state of the two-way clutch 50 is changed from the drive force transmitting state (coupled state) to the freed state (decoupled state) upon elapse of the time period T2 from the time point t0. Therefore, the one-way clutch 30 and the two-way clutch 50 are simultaneously held in the drive force transmitting state (coupled state) in shaded ranges of FIG. 9A, thereby resulting in occurrence of the phenomenon known as deadlock.

In the case where the rotation of the input shaft 11 is changed from the normal rotation to the reverse rotation, the operational state of the one-way, clutch 30 is changed from the drive force transmitting state (coupled state) to the freed state (decoupled state), and thereafter the operational state of the two-way clutch 50 is changed from the freed state (decoupled state) to the drive force transmitting state (coupled state). Therefore, the deadlock does not occur in such a case.

In order to address the above disadvantage, the coupling 20, which has the play angle θ, is provided in the present embodiment. The play angle θ is set to satisfy the following equation (3).

$$\theta \geq Z \times \lambda 2 - \lambda 1 \quad \text{Equation (3)}$$

At the time of $Z \times \lambda 2 > \lambda 1$, the value of eh play angle θ is a positive value. Furthermore, a time period Tθ is defined as follows.

Tθ (seconds): a time period required for the input shaft 11 to rotate relative to the intermediate shaft 13 through the play angle θ

In other words, the time period Tθ is an operational time lag of the intermediate shaft 13 at the time of changing the rotation of the input shaft 11 from the reverse rotation to the normal rotation. Therefore, as indicated in the timing chart of FIG. 9B, the operational state of the one-way clutch 30 is changed from the freed state (decoupled state) to the drive force transmitting state (coupled state) upon elapse of the time period (T1+Tθ) from the time point t0. Thus, the one-way clutch 30 and the two-way clutch 50 are not simultaneously held in the drive force transmitting state (coupled state), so that the occurrence of the deadlock can be advantageously avoided.

In the case where the rotation of the input shaft 11 is changed from the normal rotation to the reverse rotation, each projection 22 is returned to the initial position thereof by the spring 29 of the coupling 20. Therefore, the rotational time difference between the input shaft 11 and the intermediate shaft 13 is not generated by the presence of the play angle θ. Thereby, the behavior, which is similar to that of the comparative example shown in FIG. 9A, occurs.

As discussed above, the drive force transmission apparatus 10 of the present embodiment can implement the mechanism that cannot be implemented by the combination of the two-way clutches of the prior arts. Specifically, the drive force transmission apparatus 10 of the present embodiment can implement the mechanism that can automatically change between the drive force transmission, which results in the same rotational speed of the output shaft that is the same as the rotational speed of the input shaft, and the drive force transmission, which results in the decreased rotational speed of the output shaft that is decreased from the rotational speed of the input shaft, at the time of normal rotation of the input shaft and at the time of reverse rotation of the input shaft, respectively, by using the one-way clutch 30 and the two-way clutch 50.

The drive force transmission apparatus 10 does not include an external control device and a drive force selecting device driven with an external drive force, so that the structure of the drive force transmission apparatus 10 is simple and has a compact size, thereby enabling a reduction in the number of components and the costs. Also, the operation of the drive force transmission apparatus 10 is more reliable, so that the reliability of the drive force transmission apparatus 10 can be improved.

Furthermore, in the case where the relationship of the switching angle λ1 of the one-way clutch 30, the switching angle λ2 of the two-way clutch 50 and the input side speed reducing ratio Z is $Z \times \lambda 2 > \lambda 1$, the play angle θ can be produced with the coupling 20. Furthermore, the play angle θ is set to satisfy the above equation (3). In this way, it is possible to eliminate the possibility of the simultaneous occurrence of the drive force transmitting state (coupled state) of the one-way clutch 30 and the drive force transmitting state (coupled state) of the two-way clutch 50, and thereby it is possible to limit the occurrence of the deadlock.

Furthermore, when the input shaft 11 is rotated in the normal rotational direction from the state where the input shaft 11 is stopped or is rotated in the reverse rotational direction, each projection 22 is always rotated from the initial position through the play angle θ and finally contacts the outer wall 26 of the corresponding stopper 24 because of the provision of the spring 29 in the coupling 20. Therefore, it is possible to more reliably limit the occurrence of the deadlock.

Now, modifications of the above embodiment will be described.

(A) In the above embodiment, the rotation of the input shaft 11 is transmitted to the input side sub-shaft 51 at the decreased rotational speed due to the relationship between the input gear 41 and the first gear 42. Furthermore, the rotation of the output side sub-shaft 52 is transmitted to the output shaft 12 at the decreased rotational speed due to the relationship between the second gear 43 and the output gear 44.

That is, "the transmission of rotation at the decreased rotational speed" is followed by "the transmission of rotation at the decreased rotational speed", and the drive force transmission apparatus 10 has "the decreased rotational speed of the output shaft 12 relative to the rotational speed of the input shaft 11 as a whole". Here, when the input shaft 11 is rotated in the reverse rotational direction, the output shaft 12, which forms the outer race of the one-way clutch 30, is freed from the intermediate shaft 13, which forms the inner race of the one-way clutch 30, thereby causing the relative rotation between the output shaft 12 and the intermediate shaft 13. Thus, the rotational speed of the output shaft 12 must be lower than the rotational speed of the input shaft 11. That is, the drive force transmission apparatus 10 must have the decreased rotational speed of the output shaft 12, which is decreased from the rotational speed of the input shaft 11, as a whole.

However, the relationship between the rotational speed of the input shaft 11 and the rotational speed of the input side sub-shaft 51 and the relationship between the rotational speed of the output side sub-shaft 52 and the rotational speed of the output shaft 12 are not limited to the above-described ones of "the transmission of rotation at the decreased rotational speed followed by the transmission of rotation at the decreased rotational speed" and may be changed to "the transmission of rotation at the same rotational speed followed by the transmission of rotation at the decreased rotational speed" or "the transmission of rotation at the decreased rotational speed followed by the transmission of rotation at the same rotational speed", if desired. Alternatively, the relationship between the rotational speed of the input shaft 11 and the rotational speed of the input side sub-shaft 51 and the relationship between the rotational speed of the output side sub-shaft 52 and the rotational speed of the output shaft 12 may be "the transmission of rotation at a slightly increased rotational speed followed by the transmission of rotation at a significantly decreased rotational speed" or "the transmission of rotation at a significantly decreased rotational speed followed by the transmission of rotation at a slightly increased rotational speed", so that the drive force transmission apparatus 10 has the decreased rotational speed of the output shaft 12, which is decreased from the rotational speed of the input shaft 11, as a whole. Each of these modifications can be implemented by adjusting the numbers of teeth of the engaged gears, which are engaged with each other and/or the pitch circle diameters of the engaged gears.

In the case of "the transmission of rotation at the same rotational speed followed by the transmission of rotation at the decreased rotational speed" or the case of "the transmission of rotation at the slightly increased rotational speed followed by the transmission of rotation at the significantly decreased rotational speed", the value of "Z" of the equation (2) becomes equal to or smaller than 1. Therefore, the interpretation of "Z" is expanded from "the input side speed reducing ratio" to "the input side speed change ratio" to cover the case of "the transmission of rotation at the same rotational speed" and/or the case of "the transmission of rotation at the increased rotational speed".

(B) As discussed at the beginning of the discussion about the drive force transmission apparatus 10, the output side sub-shaft 52 may be connected to the subject mechanism in place of or in addition to the output shaft 12 (see FIG. 1). In this way, it is possible to select one of two output characteristics or to use a combination of the two output characteristics. As discussed in the above section (A), the applicable technical field of the drive force transmission apparatus 10 can be widened by appropriately selecting the relationship of the rotational speed of the output side sub-shaft 52 and the rotational speed of the output shaft 12.

(C) Each transmitting member, which transmits the rotational force from the input shaft 11 to the output shaft 12, is not limited to the spur gear and may be changed to any other appropriate member, which can implement the synchronized transmission, such as a bevel gear, a worm, a planetary gear, a frictional transmission member, a combination of a belt and a pulley, or a combination of a chain and a sprocket.

(D) The one-way rotational force transmitting member is not limited to the one-way clutch and may be changed to any other appropriate member, and the two-way rotational force transmitting member is not limited to the two-way clutch and may be changed to any other appropriate member. For example, in place of the one-way clutch, a ratchet, which allows movement in only one direction, may be used.

(E) In the above embodiment, the outer race 31 of the one-way clutch 30 is formed integrally with the output shaft 12, and the inner race 32 is formed integrally with the intermediate shaft 13. However, the outer race 31 may be formed separately from the output shaft 12 and may be thereafter coaxially joined to the output shaft 12. Furthermore, the inner race 32 may be formed separately from the intermediate shaft 13 and may be thereafter coaxially joined to the intermediate shaft 13.

(F) The projections and the stoppers of the coupling of the above embodiment shown in FIGS. 7A to 7E may be modified to those shown in FIGS. 10A to 10D.

Figure 10A:
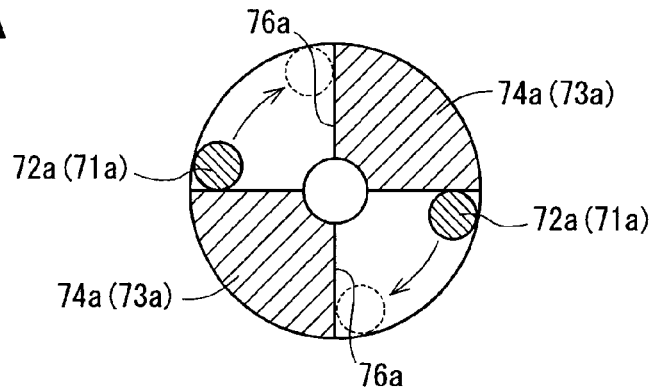
FIGS. 10A to 10D are schematic diagrams showing various modifications of the embodiment.

Specifically, in the structure of FIG. 10A, two projections 72a, each of which is configured into a cylindrical shape, are formed in the input rotor 71a, and two stoppers 74a, each of which is configured into a sector shape, are formed in the intermediate rotor (output rotor) 73a. When the input rotor 71a is rotated in the normal rotational direction, each projection 72a contacts an outer wall 76a of the corresponding stopper 74a to enable transmission of a drive force from the input rotor 71a to the intermediate rotor 73a.

Figure 10B:
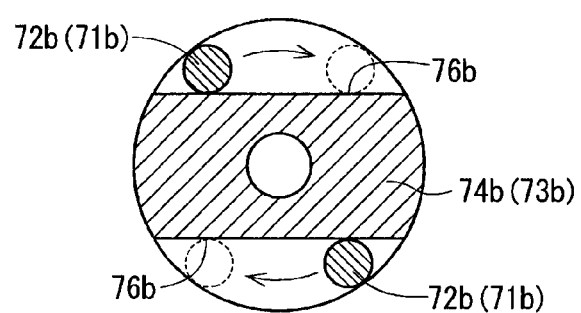

In the structure of FIG. 10B, two projections 72b, each of which is configured into a cylindrical shape, are formed in an input rotor 71b, and a stopper 74b, which has two diametrically opposed parallel sides (two outer walls 76b), is formed in the intermediate rotor (output rotor) 73b. When the input rotor 71b is rotated in the normal rotational direction, each projection 72b contacts the corresponding outer wall 76b of the stopper 74a to enable transmission of a drive force from the input rotor 71b to the intermediate rotor 73b.

Figure 10C:
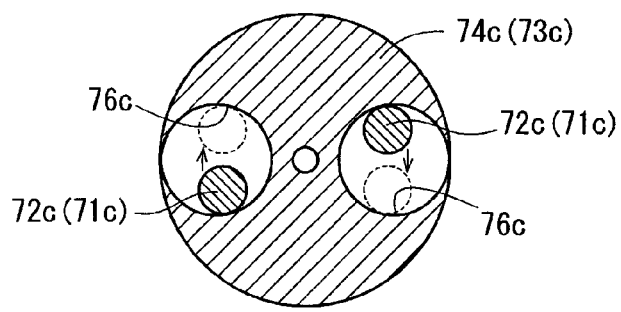

In the structure of FIG. 10C, two projections 72c, each of which is configured into a cylindrical shape, are formed in the input rotor 71c, and a stopper 74c, which has two holes, is formed in the intermediate rotor (output rotor) 73c to receive the projections 72c, respectively. When the input rotor 71c is rotated in the normal rotational direction, each projection 72c contacts an inner peripheral wall 76c of the corresponding hole of the stopper 74c to enable transmission of a drive force from the input rotor 71c to the intermediate rotor 73c.

Figure 10D:
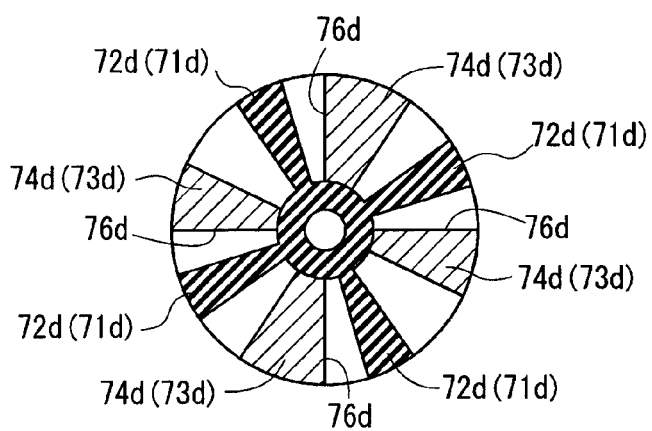

In the structure of FIG. 10D, four projections 72d, each of which is similar to the projections 22 of FIGS. 7B to 7E and is configured into a sector shape, are made of a resilient material, such as rubber. The projections 72d are provided in the intermediate rotor (input rotor) 71d, and four stoppers 74d are provided in the intermediate rotor 73d. When the input rotor 71d is rotated in the normal rotational direction, each projection 72d contacts an outer wall 76d of the corresponding stopper 74d to enable transmission of a drive force from the input rotor 71d to the intermediate rotor (output rotor) 73d. Since the projections 72d are made of the resilient material, it is possible to limit the generation of impact noise upon abutment, i.e., contact of each projection 72d against the corresponding stopper 74d.

Furthermore, the structures of FIGS. 7A to 7E and 10A to 10D may be modified as follows. Specifically, the projection(s) 22, 72a-72d may be provided in the intermediate rotor (output rotor) 23, 73a-73d, and the stopper(s) 24, 74a-74d may be provided in the input rotor 21, 71a-71d.

(G) In the above embodiment, the input rotor 21 of the coupling 20 is formed integrally with the input shaft 11, and the intermediate rotor 23 is formed integrally with the intermediate shaft 13. However, the input rotor 21 may be formed separately from the input shaft 11 and may be thereafter coaxially joined to the input shaft 11. Furthermore, the intermediate rotor 23 may be formed separately from the intermediate shaft 13 and may be thereafter coaxially joined to the intermediate shaft 13.

(H) The urging member (urging means) of the coupling 20 is not limited to the spring 29. For example, the urging member may be implemented by electromagnetic force exerting means (device). Also, the idler coupler member is not limited to the coupling 20 of the above embodiment. For example, the idler coupler member may be any other form of coupling, a bellows tube or a torsion resilient member.

Furthermore, in the case where the relationship of the switching angle $\lambda 1$ of the one-way clutch 30, the switching angle $\lambda 2$ of the two-way clutch 50 and the input side speed reducing ratio Z is $Z \times \lambda 2 \leq \lambda 1$, the equation (3) is satisfied even when the predetermined play angle $\theta$ is zero ($\theta = 0$). Therefore, the play angle $\theta$ is not absolutely necessary. Thus, the input shaft 11 and the intermediate shaft 13 may be directly connected with each other by eliminating the coupling 20. In such a case, the input shaft 11 may form the inner race 32 of the one-way clutch 30.

(I) In the above embodiment, in the view taken in the axial direction of the input shaft 11, the clockwise direction (CW direction) is defined as the normal rotational direction, and the counterclockwise direction (CCW direction) is defined as the reverse rotational direction. Alternatively, the clockwise direction (CW direction) may be defined as the reverse rotational direction, and the counterclockwise direction (CCW direction) may be defined as the normal rotational direction.

(J) The drive force transmission apparatus of the present invention is not necessarily implemented in the variable compression ratio engine and may be implemented in various other apparatuses or systems, in which the input-to-output speed ratio between the input shaft and the output shaft and the transmission torque from the input shaft to the output shaft are changed.

As discussed above, the present invention is not limited the above embodiments and modifications thereof. That is, the above embodiments and modifications thereof may be modified in various ways without departing from the sprit and scope of the invention.

The invention claimed is:

1. A drive force transmission apparatus comprising:
   an input shaft that is rotatable in each of a normal rotational direction and a reverse rotational direction, which are opposite to each other;
   an output shaft that is rotatable by a rotational force transmitted from the input shaft, wherein the output shaft is rotated in the normal rotational direction at a rotational speed, which is the same as a rotational speed of the input shaft when the input shaft is rotated in the normal rotational direction, and the output shaft is rotated in the reverse rotational direction at a decreased rotational speed, which is decreased from a rotational speed of the input shaft, when the input shaft is rotated in the reverse rotational direction;
   an input transmitting member that is fixed to the input shaft and is rotatable integrally with the input shaft;
   an input side sub-shaft that has an axis, which is different from an axis of the input shaft;
   a first transmitting member that is fixed to the input side sub-shaft and is rotatable integrally with the input side sub-shaft when rotation is transmitted from the input transmitting member to the first transmitting member;
   an output side sub-shaft that has an axis, which is different from an axis of the output shaft;
   a second transmitting member that is fixed to the output side sub-shaft and is rotatable integrally with the output side sub-shaft;
   an output transmitting member that is fixed to the output shaft and is rotatable integrally with the output shaft when rotation is transmitted from the second transmitting member to the output transmitting member;
   a one-way rotational force transmitting member that is placed between the input shaft and the output shaft, wherein the one-way rotational force transmitting member transmits a rotational force from the input shaft to the output shaft when the input shaft is rotated in the normal rotational direction, and the one-way rotational force transmitting member frees the output shaft to enable rotation of the input shaft relative to the output shaft when the input shaft is rotated in the reverse rotational direction; and
   a two-way rotational force transmitting member that is placed between the input side sub-shaft and the output side sub-shaft, wherein the two-way rotational force transmitting member transmits a rotational force from the input side sub-shaft to the output side sub-shaft, and the two-way rotational force transmitting member frees the input side sub-shaft to enable rotation of the output side sub-shaft relative to the input side sub-shaft upon application of a rotational force from the output side sub-shaft, wherein:
   the rotational force of the input shaft is transmitted to the output shaft through the one-way rotational force transmitting member when the input shaft is rotated in the normal rotational direction; and
   the rotational force of the input shaft is transmitted to the output shaft through the input transmitting member, the first transmitting member, the input side sub-shaft, the two-way rotational force transmitting member, the output side sub-shaft, the second transmitting member and the output transmitting member when the input shaft is rotated in the reverse rotational direction.

2. The drive force transmission apparatus according to claim 1, further comprising an idler coupler member that couples between the input shaft and the output shaft in a manner that enables relative rotation between the input shaft and the output shaft through a predetermined angular range.

3. The drive force transmission apparatus according to claim 2, wherein:
   the idler coupler member is a coupling, which includes:
   an input rotor fixed to the input shaft;
   an intermediate rotor fixed to an intermediate shaft that is placed between the input shaft and the output shaft;
   a projection, which is provided in one of the input rotor and the intermediate rotor; and
   a stopper, which is provided in the other one of the input rotor and the intermediate rotor, and to which the projection is contactable;
   relative rotation between the input rotor and the intermediate rotor is enabled within a predetermined play angle until the projection contacts the stopper;
   when the projection contacts the stopper, a rotational force of the input shaft is transmittable to the intermediate shaft;
   the one-way rotational force transmitting member is placed between the intermediate shaft and the output shaft;
   the one-way rotational force transmitting member transmits a rotational force from the intermediate shaft to the output shaft when the intermediate shaft is rotated in the normal rotational direction; and
   the one-way rotational force transmitting member frees the output shaft to enable rotation of the intermediate shaft relative to the output shaft when the intermediate shaft is rotated in the reverse rotational direction.

4. The drive force transmission apparatus according to claim 3, wherein:
   the predetermined play angle of the coupling is set to satisfy a relationship of:

$$\theta \geq Z \times \lambda 2 - \lambda 1$$

where:
   $\theta$ denotes the predetermined play angle:
   $\lambda 1$ denotes a switching angle that is required to change an operational state of the one-way rotational force transmitting member from a freed state, in which the one-way rotational force transmitting member frees the output shaft upon rotation of the input shaft in the reverse rotational direction, to a drive force transmitting state, in which the one-way rotational force transmitting member transmits the rotational force from the input shaft to the output shaft upon rotation of the input shaft in the normal rotational direction;
   $\lambda 2$ denotes a switching angle that is required to change an operational state of the two-way rotational force transmitting member from a drive force transmitting state, in which the two-way rotational force transmitting member transmits the rotational force from the input side sub-shaft to the output-side sub-shaft, to a freed state, in which the two-way rotational force transmitting member frees the input side sub-shaft upon the application of the rotational force from the output side sub-shaft; and Z denotes an input side speed change ratio, which is a ratio of the number of rotations of the input shaft per unit time over the number of rotations of the input side sub-shaft per unit time.

5. The drive force transmission apparatus according to claim 4, wherein the coupling includes urging means for urging the input rotor against the intermediate rotor in the reverse rotational direction to return the projection to a location, at which the predetermined play angle is provided between the projection and the stopper when rotation of the input shaft in the normal rotational direction is stopped or is changed to the rotation in the reverse rotational direction.

* * * * *